H. A. MARTIN.
CREDIT ACCOUNT REGISTER.
APPLICATION FILED APR. 8, 1916. RENEWED SEPT. 26, 1919.

1,423,953.

Patented July 25, 1922.

Inventor
HAAKON A. MARTIN
by R. C. ...
Earl Beust
Attorneys

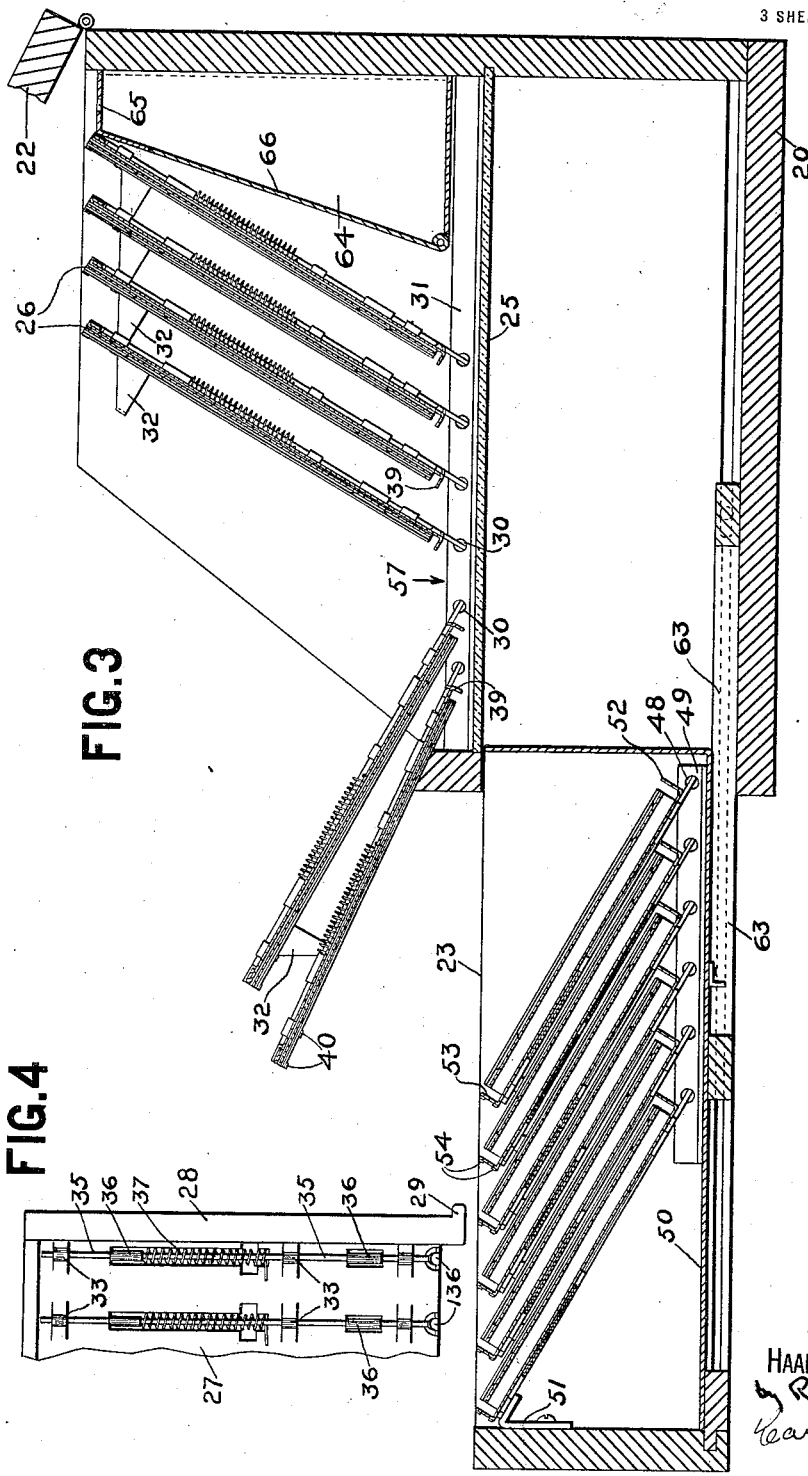

H. A. MARTIN.
CREDIT ACCOUNT REGISTER.
APPLICATION FILED APR. 8, 1916. RENEWED SEPT. 26, 1919.
1,423,953.
Patented July 25, 1922.
3 SHEETS—SHEET 3.
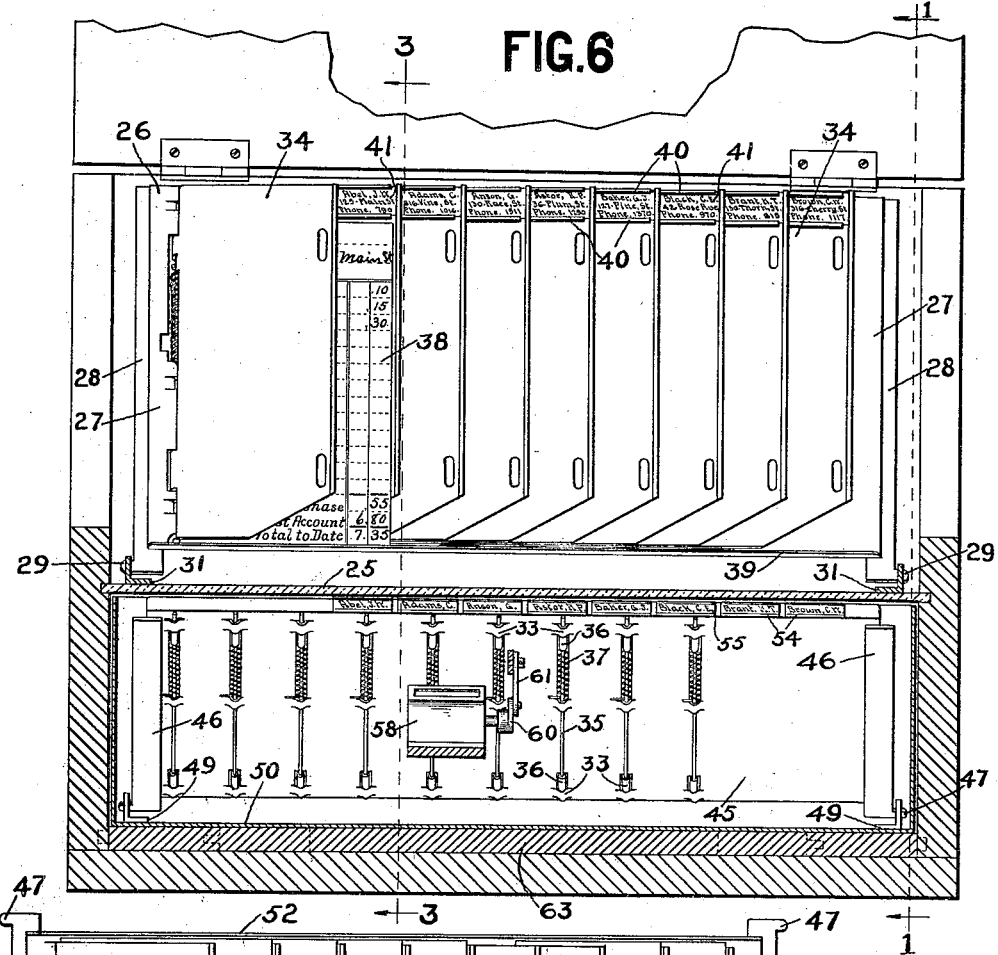
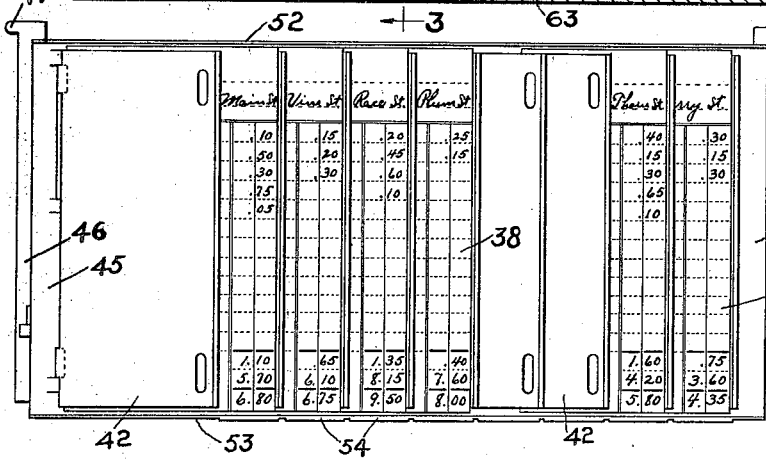
Inventor
HAAKON A. MARTIN
Attorneys

UNITED STATES PATENT OFFICE.

HAAKON A. MARTIN, OF CHRISTIANIA, NORWAY, ASSIGNOR TO THE NATIONAL CASH REGISTER COMPANY, OF DAYTON, OHIO.

CREDIT-ACCOUNT REGISTER.

1,423,953.  Specification of Letters Patent.  Patented July 25, 1922.

Application filed April 8, 1916, Serial No. 89,774. Renewed September 26, 1919. Serial No. 326,557.

*To all whom it may concern:*

Be it known that I, HAAKON A. MARTIN, a citizen of the United States, residing at Christiania, Norway, have invented certain new and useful Improvements in Credit-Account Registers, of which I declare the following to be a full, clear, and exact description.

This invention relates to credit or account registers and has more particular relation to that class of account registers employed for filing duplicates of charge sales slips in retail stores, such as groceries, meat markets and the like.

The present invention is designed to perform substantially the same functions as those outlined in a copending application of the present applicant, Serial No. 89,270, filed April 6, 1916. Certain of the structures herein shown are common to both the present application and the copending application just above noted. Such of the details as are common to the two cases are fully shown, described and claimed in said copending application and merely a general description of the same will be given herein.

It is customary in retail stores to provide some form of account register or filing cabinet to facilitate the handling of duplicate charge sales slips on all charge transactions, and to classify the sales slips, according to the customers making the charge purchases. It is customary to provide a filing cabinet in which a large number of pockets or filing spaces are provided, each of which is assigned to the account of some one customer. In a pocket of a particular customer all of the sales slips for an indefinite period are filed and are constantly open. This frequently leads to loss on the part of the proprietor, in that the cabinet being easy of access, any one in collusion with the customer may destroy some of the old sales slips, and thereby destroy all record of the account for that customer.

It is the purpose of the present invention to provide a suitable filing space for the sales slips in which the sales slips will be filed immediately upon the making of the sale and also to provide an auxiliary filing space in conjunction therewith wherein all the sales slips for previous sales will be filed. It is the purpose of the invention to provide the auxiliary filing space which is inaccessible while permitting the reading of the totals on each of the accounts so as to enable the clerk to enter upon a charge slip at the time of making a sale the account to date so that he may compute the total of the account.

With these and incidental objects in view, the invention consists in certain novel features of construction and combinations of parts, the essential elements of which are set forth in appended claims and a preferred form of embodiment of which is hereinafter described with reference to the drawings which accompany and form part of the specification.

Of said drawings:

Fig. 3 is a cross section of the filing device taken approximately on the line 3—3 of Fig. 6, showing the filing units in both the temporary and permanent sections in cross section, and also showing the locked receptacle in withdrawn position.

Fig. 4 is a partial detail of one of the filing units showing the details of a spring mechanism for holding the filling leaves in position to retain the inserted slips.

Fig. 5 is a detail cross section of a part of one of the filing units in the permanent filing section.

Fig. 6 is cross section taken approximately on the line 6—6 of Fig. 1.

Fig. 7 is a detail plan view of one of the filing units of the permanent section.

Figure 1:
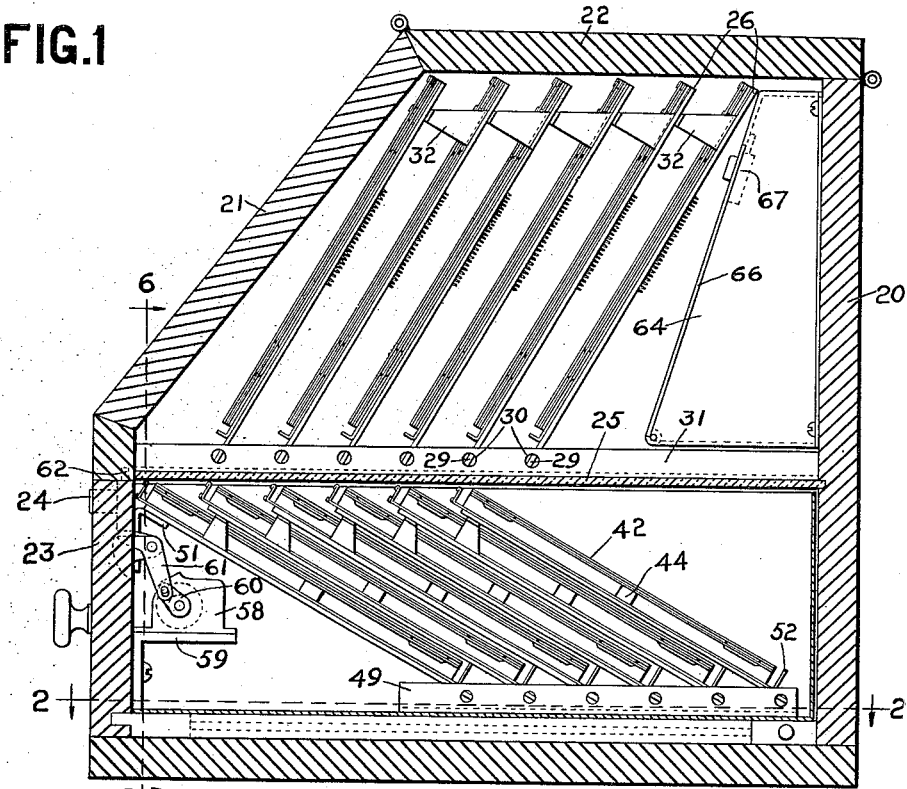
Fig. 1 is a cross section of the cabinet or casing approximately on the line 1—1 of Fig. 6 and showing the filing units contained therein.

The filing cabinet of the present invention comprises an enclosing casing 20 being provided with double hinged lids 21 and 22, so hinged and constructed to permit of the folding of said lids over the back of the cabinet. The cabinet 20 also contains a drawer 23 slidable in the lower portion or section of the cabinet and preferably locked in inner position by lock 24. Just above the sliding drawer 23 the cabinet is provided with a division plate 25 which completely divides the lower drawer compartment from the upper section of the cabinet 20. The dividing plate 25 is preferably of glass or other material forming a protected sight opening, in order to permit the reading of the account slips in the filing units of the drawer, and at the same time to prevent access to said drawer.

Mounted in the upper portion of the cabinet or casing 20 are a plurality of temporary filing units 26 (Figs. 1, 3 and 6). Each of the filing units 26 comprises a plate 27 (Figs. 4 and 6) preferably of sheet metal. At either end, the plate 27 has welded or otherwise fastened thereon a strip 28 which is formed with a pivotal point 29 adapted to cooperate with holes 30 pierced in angle bars 31 fast on division 25. It will readily be seen that by reason of this manner of mounting the filing units 26 may be swung about their pivots 29 to the positions shown in Fig. 3. In order to hold the filing units 26 properly spaced apart so that the slips in the pockets carried thereby and hereinafter described, will not become dislodged by rubbing against the adjacent filing unit, spacing arms 32 are provided, which arms are preferably struck up from the plate 27 of the filing unit. This, as shown in Figs. 1 and 3, will hold the filing units 26 in the positions shown in Figs. 1 and 3.

The plate 27 is punched and formed with eyes 33 to provide hinging points for leaves 34 which are pivoted to said plate 27 by pivot pins 35 passing through said eyes and eyes 36 formed on the leaves 34. Small ears 136 struck from the plate 27 extend beneath the pins 35 and prevent their slipping down out of place. A spring 37 surrounding each of the pivot pins 35 acts to hold said leaves 34 yieldingly against each other, the right hand leaf 34 (Fig. 6) resting against the body plate 27 of each of the filing units.

The leaves 34 thus constructed form pockets for sales slips 38 (Fig. 6) which sales slips are intended to be inserted in the pockets (Fig. 6). When the slips are inserted in the pockets, they rest upon a ledge 39 formed in the shape of a flange struck forward over the plates 27 at their lower edges. Each of the leaves 34, except the left hand leaf, is formed with rolls 40 formed on the leaves 34 to form pockets which are adapted to contain name and address labels 41 to designate the account to which the particular filing pocket is assigned. As shown in Fig. 6 the sales slips pertaining to a certain account will appear just below the label 41 for that account. In this way the pocket assigned to a particular account may readily be found, the lower right hand corners of the leaves being cut away as shown to expose the corner of the slips bearing the totals and their legends.

The filing units shown as located in the sliding drawer 23 in the base of the filing cabinet, are substantially of the same construction in so far as operation and method of mounting as those shown in the upper portion of the cabinet, the filing units in the lower portion of the cabinet being termed the permanent filing units for the sake of clearness. The permanent filing units are substantially the same in all details (the same reference numerals being applied) as the temporary filing units with the exception that the leaves 42 forming the pockets of the permanent filing units are angled as shown at 43 to provide a space for filing more sales slips than may be inserted in the pockets of the temporary filing units. The permanent filing units, as hereinafter outlined, are arranged to contain all of the slips transferred from the temporary filing units and to retain said slips for a period of a week or a month, according to when the accounts are payable. In order to compensate for the provision of the angles 43 of the leaves 42, a rest 44 is struck up from the body plate of each of the permanent filing units. The rest 44, as will be seen in Fig. 5, is provided only for the right hand leaf 42.

The permanent filing units comprise a main body plate 45 which is similar to the body plate 27 of the temporary filing units 26, and are pivoted in the drawer 23 in substantially the same manner as are the temporary filing units pivoted in the upper section of the filing cabinet. Each of the body plates 45 of the permanent units carries at either end a strip 46 formed with a pivotal point 47 to cooperate with holes 48 formed in angle bars 49 fast on the base plate 50 of the drawer 23. As shown in Figs. 1 and 3 the permanent filing units normally are inclined forward, the foremost one resting at its upper end on an angle rest 51 fast on the front of the drawer 23.

In order to have the sales slips so arranged in the permanent filing units that the totals in the sales slips, as shown in Fig. 7, will appear at the upper front end of the filing pockets, the sales slips are inserted in the pockets with the regular upper edge of the sales slip resting on a ledge 52 struck upward at the inner and lower ends of the body plate 45 of the permanent filing units.

At the upper end each of the plates 45 has a small flange 53 struck up from the said plate and being formed with rolls 54 to provide pockets in which address slips or labels 55 are inserted so as to identify the pockets to which the accounts are assigned. The plates 45 are also formed with spacing arms 56 which are similar in construction and purpose as the spacing arms 32 of the temporary filing units.

When the drawer 23 is in innermost position, as shown in Fig. 1, the pockets of a permanent filing unit will be in such a position that the totals of the slips contained therein will be exhibited through the transparent division or protected sight opening 25 of the filing cabinet, and in a position wherein said totals may be viewed between the pivotal points 29 of the temporary filing units assigned to the same accounts and the temporary filing section directly in front of the same. When certain of the temporary filing units 26 are tilted forward about their pivots, as shown in Fig. 3, certain accounts will be displayed on the foremost of the then upright temporary filing units. By looking down through the sight opening 25 at the point indicated by the arrow marked 57 the total of the account to date may be seen on the last sales slip filed in the corresponding permanent filing unit in a locked drawer or receptacle 23, the pocket assigned to the account for a certain customer in the permanent filing unit being directly below the corresponding account pocket in the temporary filing unit.

Figure 2:
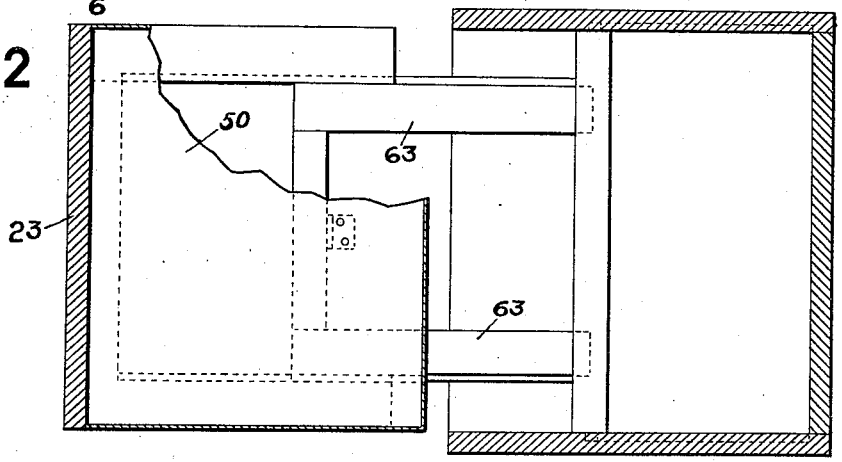
Fig. 2 is a cross section of the casing or cabinet taken on the line 2—2 of Fig. 1 and looking downward to show the extension slide for the locked drawer or receptacle.

In order to detect any unauthorized opening of the drawer 23 by manipulation of the lock 24, a step-by-step counter 58 is provided. The counter is mounted on an angle shelf 59 fast to the front of the drawer 23. The crank arm 60 provided for operating the step-by-step counter 58 is operated by a pivoted bell crank lever 61 which is adapted to be moved counter clockwise, as viewed in Fig. 1, each time the bolt 62 of the lock 24 is lowered to unlock the drawer 23. In this manner a strict account is kept of the number of times the drawer 23 is unlocked. In order to permit of the complete withdrawal of the drawer 23 to the position shown in Fig. 3, the drawer is provided with an extension slide at 63 (Figs. 2 and 3). This drawer extension slide 63 is of the usual well known construction and as it forms no part of the present invention detailed description of the same will be omitted from the present description.

In order to provide a suitable filing space for copies of "C. O. D." slips while the deliveries are being made and preparatory to checking the delivery man on return a compartment 64 is provided in the rear of the temporary filing units. The compartment is provided with a slot 65 through which the slips are deposited. The compartment 64 is provided with a hinged door 66 to facilitate removal of the slips, said door being normally locked by a lock 67.

A general operation of a filing cabinet of the type shown herein is as follows: When a clerk makes a charge sale he first rocks the temporary filing units 26 forward to expose the temporary filing unit 26 bearing the pocket formed by the leaves 34 thereon which is assigned to the account of the particular customer making a charge purchase. If there is no slip 38 in that particular pocket of the temporary filing units the clerk looks down through the sight opening 25 and there views directly below the pocket of the temporary filing unit the slips for past charge sales of the same account which are on file in the corresponding pocket of the permanent filing unit in the drawer 23. In this way he ascertains the totals to date appearing on the sales slips in the permanent filing unit and enters that date on the other slips which he has filed out beside the legend "Past account." He then computes and enters at the bottom of the sales slip the new total to date beside the legend "Total to date."

At the end of the day the proprietor or manager of the store can tell at a glance by looking over the temporary filing units just who of his charge customers have made purchases during the day. He can then readily compare the totals shown on the slips in the temporary filing units with the totals on the slips immediately below in the permanent filing units. In this way he can determine whether or not the clerks carried forward the grand total in making out the new charge slip. Having ascertained that all slips are correct, the proprietor unlocks the drawer 23 and draws the same out to the position shown in Fig. 3. He will then remove the sales slips from the pockets of the temporary filing units and transfer the same to the proper pocket of the permanent filing units, being guided by the labels 55 on the permanent filing units.

It will thus be noted that the drawer 23 being at all time under lock and key, access to the sales slips in the permanent filing units may not be had while permitting the clerk readily to ascertain the total of an account to date in order to enable him to fill out the new sales slip.

While the form of mechanism herein shown and described, is admirably adapted to fulfill the objects primarily stated, it is to be understood that it is not intended to confine the invention to the one form of embodiment herein disclosed, for it is susceptible of embodiment in various forms all coming within the scope of the claims which follow.

What is claimed is:

1. A filing device comprising two series of corresponding filing units movable independently of each other, locking means for rendering one of said series inaccessible, and the two series arranged whereby the inaccessible units are visible singly only when the corresponding accessible unit is exposed.

2. A filing device comprising two series of filing units, the units of one series corresponding with the units of the other series and each series being movable independently of the other, means for rendering one of said series normally inaccessible, and the two series arranged whereby the inaccessible units are visible singly only when each corresponding accessible unit is exposed.

3. A filing device comprising two series of filing units, the units of one series corresponding with the units of the other series and each series being movable independently of the other, means for rendering one of said series normally inaccessible, and the two series arranged whereby the inaccessible units are visible only after the accessible units have been exposed.

4. A filing device comprising two series of corresponding superimposed filing units, the units of each series movable independently of the units of the other series the parts arranged whereby the units of one series are visible singly only when each corresponding unit of the other series is exposed.

5. A filing cabinet comprising a casing, two series of filing units mounted therein, the units of each series movable independently of the units of the other series, one of said series mounted above the units of the other whereby the units of one series are visible only when the units of the other series are exposed.

6. A filing device comprising two series of filing units, one of said series mounted above the other, the units of each series corresponding with the units of the other series and movable independently thereof, means for rendering the units of one series normally inaccessible and visible singly only when each corresponding unit of the other series is exposed.

7. In a filing cabinet, the combination of a casing having an accessible and an inaccessible section, two series of filing units one series being mounted in each of said sections, the units of each series corresponding with the units of the other series and movable independently thereof, and the parts arranged whereby the units in the inaccessible section are visible singly only when each corresponding unit of the accessible series is exposed.

8. In a filing cabinet, the combination of a casing having an accessible section and an inaccessible section, two series of filing units one series being mounted in each of said sections, the units of each series corresponding with the units of the other series and movable independently thereof, and the inaccessible section mounted beneath the accessible section whereby the units in the inaccessible section are visible singly only when each corresponding unit of the accessible series is exposed.

9. In a filing cabinet, the combination of a casing having an accessible and an inaccessible section, and transparent means separating the two sections, two series of filing units one series being mounted in each of said sections, the units of each series corresponding with the units of the other series and movable independently thereof, the parts arranged whereby the units of the inaccessible section are visible singly through said transparent means when each corresponding unit of the accessible series is exposed.

10. In a filing cabinet, the combination of a casing having an accessible and an inaccessible section, the said sections mounted one above the other and transparent means separating them, two series of filing units one series being mounted in each of said sections, the units of each series corresponding with the units of the other series and movable independently thereof, the parts arranged whereby the units of the inaccessible section are visible singly through said transparent means when each corresponding unit of the accessible series is exposed.

11. In a filing cabinet, the combination of a casing having an accessible section and an inaccessible section, said inaccessible section removable from the casing, two series of filing units one series being mounted in each of said sections, the units of each series corresponding with the units of the other series and movable independently thereof, the parts arranged whereby when the inaccessible section is within the casing the units of the inaccessible series are visible singly only when the corresponding unit of the accessible series is exposed.

12. In a filing cabinet, the combination of a casing, a drawer slidably mounted therein, a series of filing units mounted in said drawer, a second series of filing units mounted above the said drawer, the units of both of said series corresponding with each other, the parts arranged whereby the units in the drawer are visible singly only when the corresponding unit of the series above the drawer is exposed.

13. In a filing cabinet, the combination of a casing, a drawer slidably mounted therein, a series of filing units mounted in said drawer, a second series of filing units mounted above the said drawer, the units of both of said series corresponding with each other, a transparent partition between the drawer and the series of filing units above it whereby the units in the drawer are visible singly through the transparent partition only when the corresponding unit of the series above the drawer is exposed.

14. In a filing cabinet, the combination of a casing having two sections, a transparent division between them, a series of filing units in each section and independently movable, the units of each series corresponding with the units of the other, the units of one series pivotally mounted and having their pivotal points so arranged that when one unit thereof is exposed the corresponding unit of the other series is visible.

15. In a filing cabinet, the combination of a casing, a series of filing units mounted therein, a transparent partition above said filing units, a second series of filing units corresponding to said first series and pivotally mounted over said transparent partition, the pivotal points of said second series being so spaced as to render the corresponding unit of the first series visible when one of the second series is exposed.

16. In a filing cabinet, the combination of a casing, a series of filing units mounted therein, a transparent partition above said filing units, a second series of filing units corresponding to said first series and pivotally mounted over said transparent partition, the pivotal points of said second series being so spaced as to render the corresponding unit of the first series visible when one of the second series is exposed, and means for rendering the first mentioned series of units normally inaccessible.

17. In a filing cabinet, the combination of a casing, a series of filing units mounted therein, a transparent partition above said filing units, a second series of filing units corresponding to said first series and pivotally mounted over said transparent partition, the pivotal points of said second series being so spaced as to render the corresponding unit of the first series visible when one of the second series is exposed, and locking means for rendering the first mentioned series of units normally inaccessible.

18. In a filing cabinet, the combination of a casing having two sections, a series of filing units in each section and independently movable, the units of each series corresponding with the units of the other, the units of one series pivotally mounted within the casing and having their pivotal points so arranged that when one unit thereof is exposed the corresponding unit of the other series is visible.

19. In a filing cabinet, the combination of a casing having two superimposed sections, a series of filing units in each section and independently movable, the units of each series corresponding with the units of the other, the units of the series within the upper section pivotally mounted and having their pivotal points so arranged that when one unit thereof is exposed the corresponding unit of the series in the lower section is visible.

20. In a filing cabinet, the combination of a casing having two superimposed sections, a series of filing units in each section, the units of each series corresponding with the units of the other, the units of the series within the upper section pivotally mounted and having their pivotal points so arranged that when one unit thereof is exposed the corresponding unit of the series in the lower section is visible.

21. In a filing cabinet, the combination with a suitable casing or frame, of a drawer slidably mounted therein, a series of filing units mounted in said drawer, a transparent division in said casing above said drawer and through which the contents of said units are visible, a second series of units corresponding to said first series, said second series being pivotally mounted over said transparent division, the pivotal points of said second series being so spaced as to render the corresponding one of the first series of units visible when the one of the second series is exposed.

22. In a filing cabinet, the combination of a casing having accessible and inaccessible sections, of a protected sight opening between said sections, series of filing units, one series being mounted in each of said sections, the units of each series corresponding with the units of the other series and movable independent thereof, the parts arranged whereby the units of the inaccessible section are visible singly through said sight opening when a corresponding unit of the accessible series is exposed.

23. In a filing cabinet, the combination of a casing having an accessible and inaccessible section, the said sections being mounted one above the other and having a protected sight opening there between, two series of filing units one series being mounted in each of said sections the units of each series corresponding with the units of the other series and movable independently thereof, whereby the units of the inaccessible section are visible singly through said sight opening when each corresponding unit of the accessible series is exposed.

24. In a filing cabinet, the combination of a casing, a receptacle mounted therein, a series of filing units mounted in said receptacle, a second series of filing units mounted above said receptacle, the units of both of said series corresponding with each other, the parts being arranged whereby the units in the receptacle are visible singly only when the corresponding unit of the series above the receptacle is exposed.

25. In a filing cabinet, the combination of a casing, a receptacle mounted therein, a series of filing units mounted in said receptacle, a second series of filing units mounted above said receptacle, the units of both of said series corresponding with each other, a protected sight opening between the receptacle and the series of filing units above it whereby the units in the receptacle are visible singly through the protected sight opening only when the corresponding unit of the series above the receptacle is exposed.

26. In a filing cabinet, the combination of a casing having two sections, a protected sight opening between them, a series of filing units in each section and independently movable, the units of each series corresponding with the units of the other series, the units of one series being mounted so that when one unit thereof is exposed the corresponding unit of the other series is visible.

27. In a filing cabinet, the combination of a casing, a series of filing units mounted therein, a protected sight opening above said filing units, a second series of filing units corresponding to said first series and mounted over said protected sight opening, the mounting of said second series being so as to render the corresponding unit of the first series visible when any one of the second series is exposed.

28. In a filing cabinet, the combination of a casing, a series of filing units mounted therein, a transparent partition above said filing units, a second series of filing units corresponding to said first series and mounted over said transparent partition, the mounting of said second series being so as to render the corresponding unit of the first series visible when any one of the second series is exposed.

In testimony whereof I affix my signature.

HAAKON A. MARTIN.